(12) United States Patent
Nagai

(10) Patent No.: US 12,541,193 B2
(45) Date of Patent: Feb. 3, 2026

(54) MONITORING SYSTEM

(71) Applicant: SHIMADZU CORPORATION, Kyoto (JP)

(72) Inventor: Yusuke Nagai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/509,020

(22) Filed: Oct. 24, 2021

(65) Prior Publication Data

US 2022/0171375 A1    Jun. 2, 2022

(30) Foreign Application Priority Data

Dec. 1, 2020 (JP) .................................. 2020-199288

(51) Int. Cl.
*G05B 19/418* (2006.01)

(52) U.S. Cl.
CPC .................. *G05B 19/41875* (2013.01); *G05B 2219/32368* (2013.01)

(58) Field of Classification Search
None
See application file for complete search history.

(56) References Cited

U.S. PATENT DOCUMENTS 4,464,653 A * 8/1984 Winner ................ G01D 18/008
340/870.18
5,372,716 A * 12/1994 Levy .................. B01D 11/0203
210/659
6,354,143 B1 * 3/2002 Isobe ................. F02M 25/0809
73/49.7

(Continued)

FOREIGN PATENT DOCUMENTS

CN   112254972 A  *  1/2021 ............. G01D 21/02
JP   H0718857 B2  *  3/1987

(Continued)

OTHER PUBLICATIONS

Notice of Reasons for Refusal for corresponding Japanese Patent Application No. 2020-199288 dated Oct. 5, 2023, with English machine translation.

(Continued)

*Primary Examiner* — Jason Lin
(74) *Attorney, Agent, or Firm* — Renner, Otto, Boisselle & Sklar, LLP

(57) ABSTRACT

To prevent operation of an analysis system from being stopped every time an error occurs in an analysis device of a monitoring system. A monitoring system includes an analysis device provided with a plurality of sensors, an error detector configured to detect occurrence of an error in the analysis device based on an output signal of a plurality of the sensors, and to identify a type of the detected error, an information storage part storing levels set in advance for each of a plurality of types of errors that may occur in the analysis device, and an error level identification part configured to identify a level of an error detected by the error detector based on information stored in the information storage part Where an error occurs in the analysis device, a measure according to the level of the error identified is executed in the analysis device.

4 Claims, 2 Drawing Sheets

(56) References Cited

U.S. PATENT DOCUMENTS

| | | | |
|---|---|---|---|
| 6,792,794 B2* | 9/2004 | Bonne | G01N 25/18 73/25.05 |
| 2002/0087937 A1 | 7/2002 | Muth et al. | |
| 2003/0069650 A1* | 4/2003 | Karmiy | G05B 19/056 700/86 |
| 2006/0062878 A1* | 3/2006 | Ruppe | A23J 3/16 426/422 |
| 2007/0073521 A1* | 3/2007 | Carle | G05B 23/0278 700/80 |
| 2008/0039993 A1* | 2/2008 | Cleary | G06N 5/02 701/32.7 |
| 2008/0168826 A1* | 7/2008 | Saidi | G01M 3/20 73/40 |
| 2009/0211980 A1* | 8/2009 | Liu | G01N 30/26 210/659 |
| 2013/0318917 A1* | 12/2013 | Nilsson | G01M 3/22 73/49.3 |
| 2015/0233875 A1* | 8/2015 | Takahashi | G01N 30/88 73/61.53 |
| 2017/0116503 A1 | 4/2017 | Kawabata et al. | |
| 2018/0340916 A1* | 11/2018 | Song | G01N 30/32 |
| 2020/0319259 A1* | 10/2020 | Pressman | G05B 19/042 |

FOREIGN PATENT DOCUMENTS

| | | | |
|---|---|---|---|
| JP | S6258168 A | | 3/1987 |
| JP | H10187232 A | * | 7/1998 |
| JP | 2002-267644 A | | 9/2002 |
| JP | 2012003436 A | * | 1/2012 |
| JP | 2014048809 A | | 3/2014 |
| JP | 2017-83485 A | | 5/2017 |
| WO | WO-2020174514 A1 | * | 9/2020 |
| WO | WO-2020175510 A1 | * | 9/2020 ........... G01N 30/468 |

OTHER PUBLICATIONS

Office Action for corresponding Chinese Patent Application No. 202111218479.2 issued Mar. 15, 2024, with English machine translation.

Rejection Decision for corresponding Chinese Patent Application No. 202111218479.2 issued Sep. 27, 2024, with English machine translation.

* cited by examiner

MONITORING SYSTEM

BACKGROUND OF THE INVENTION

1. Field of the Invention

The present invention relates to a monitoring system.

2. Description of the Related Art

As introduction into product and quality processes progresses, it is important to continuously monitor the manufacturing process as automatically as possible and confirm that the required product quality is ensured. As a method for the above, the employment of Process Analytical Technology (PAT) has been promoted, and introduction of the above is in progress particularly in the oil and chemical industry.

The introduction of PAT has been actively studied in the pharmaceutical industry in recent years. The introduction of the PAT not only improves the reliability and robustness of the manufacturing process but also has a cost reduction effect. A liquid chromatograph (LC) is also an element necessary for a PAT system, and technological development for real popularization is in progress.

One of targets of monitoring by PAT is a manufacturing line of a drug substance. A manufacturing line for a drug substance often handles an organic solvent and hydrogen, and thus is designated as a hazardous area, and equipment to be installed is required to be explosion-proof.

SUMMARY OF THE INVENTION

As one of explosion-proof measures required for an analysis device, there is a measure of stopping all energization in the analysis device when an error occurs in the analysis device. In general, the presence or absence of an error in an analysis device is monitored in an analysis system including the analysis device, and a result of the monitoring is output to a management device that manages the analysis system. A signal output from the analysis system to the management device only relates to the presence or absence of occurrence of an error. In a case where the management device detects occurrence of an error in the analysis device by a signal output from the analysis system, the management device cuts off power supply to each constituent of the analysis device to stop energization in the analysis device, and does not allow energization of the analysis device until the error is resolved.

However, in the above measure, even in a case where the error that occurs in the analysis device is a minor error that can be autonomously recovered in the analysis device (error that can be recovered without turning off the power supply), all the energization in the power supply device is stopped, and it takes time to restart the operation.

The present invention has been made in view of the above problem, and an object of the present invention is to prevent the operation of the analysis system from stopping every time an error occurs in the analysis device of the monitoring system.

A monitoring system according to the present invention includes an analysis device provided with a plurality of sensors, an error detector configured to detect occurrence of an error in the analysis device based on an output signal of a plurality of the sensors, and to identify a type of the detected error, an information storage part storing levels which have been set in advance for each of a plurality of types of errors that may occur in the analysis device, and an error level identification part configured to identify a level of an error detected by the error detector based on information stored in the information storage part. The monitoring system is configured so that in a case where an error occurs in the analysis device, a measure according to the level of the error identified by the error level identification part is executed in the analysis device.

In the monitoring system according to the present invention, when occurrence of an error in the analysis device is detected, a level of the error that occurs is identified, and a measure according to the level is executed in the analysis device. Therefore, it is possible to prevent operation of the analysis system from being stopped every time an error occurs in the analysis device.

DETAILED DESCRIPTION OF THE INVENTION

Hereinafter, an embodiment of a monitoring system according to the present invention will be described with reference to the drawings.

Figure 1:
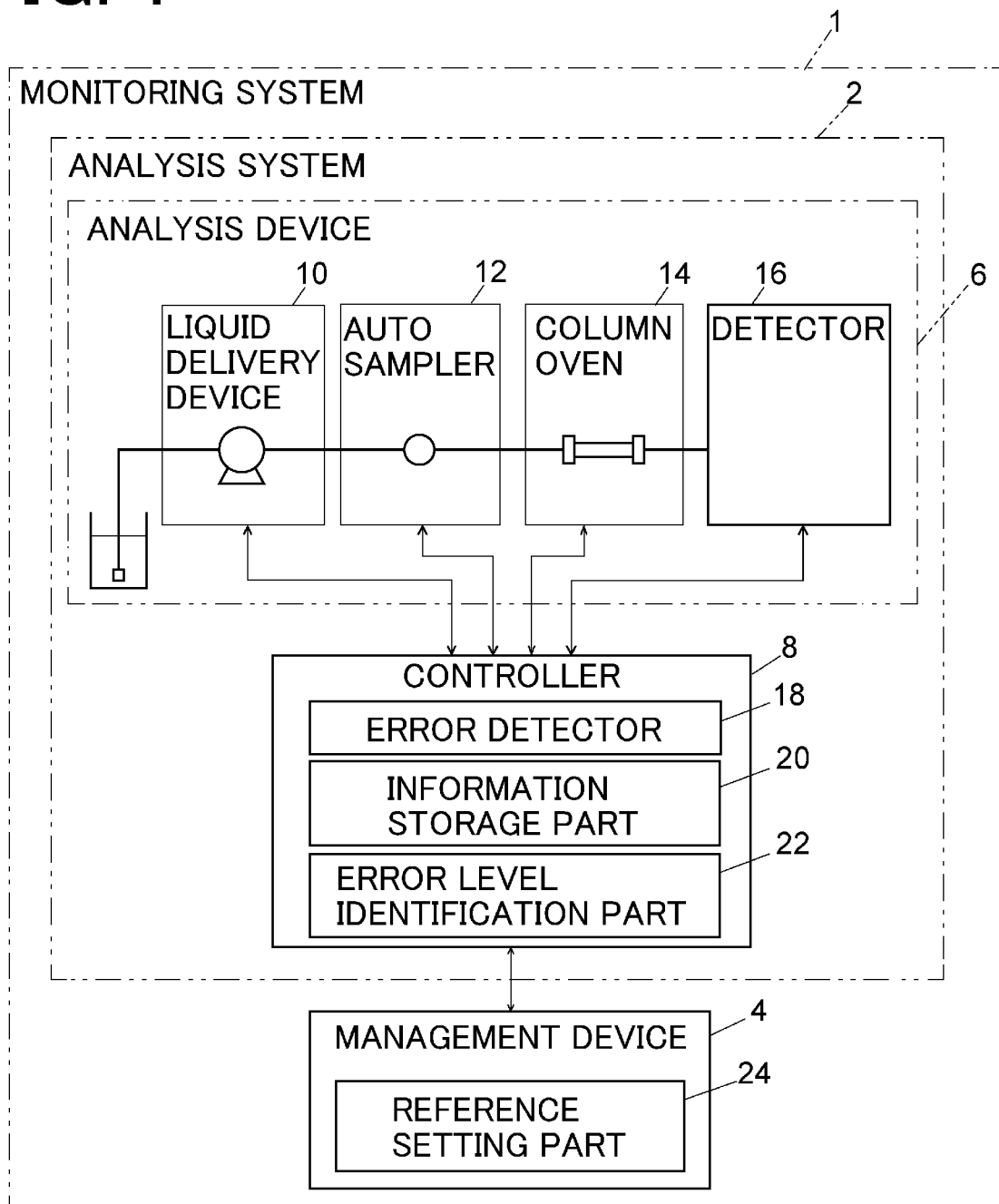
FIG. 1 is a schematic configuration diagram illustrating an embodiment of a monitoring system.

As illustrated in FIG. 1, the monitoring system 1 includes an analysis system 2 and a management device 4. The analysis system 2 includes an analysis device 6 and a controller 8.

The analysis device 6 is a liquid chromatograph including a liquid delivery device 10, an autosampler 12, a column oven 14, and a detector 16. The analysis device 6 injects a sample by the autosampler 12 into a mobile phase sent by the liquid delivery device 10, separates components in the sample by a separation column arranged in the column oven 14, and detects the separated components by the detector 16. The controller 8 is provided to be able to communicate with each of the liquid delivery device 10, the autosampler 12, the column oven 14, and the detector 16 of the analysis device 6, and controls the operation of the analysis device 6. The controller 8 is a computer device including a central processing unit (CPU) and the like, and is realized by a dedicated system controller and the like.

The management device 4 is provided to be able to communicate with the controller 8, and manages the operation of the analysis system 2 through the controller 8. The management device 4 is a computer device including a CPU and the like, and is realized by a general-purpose personal computer or the like into which predetermined software is introduced.

The analysis device 6 is provided with various sensors such as a pressure sensor for detecting a system pressure and a leak sensor for detecting liquid leakage. Outputs of these sensors are taken into the controller 8.

The controller 8 includes an error detector 18, an information storage part 20, and an error level identification part 22. The error detector 18 and the error level identification part 22 are functions obtained by a CPU executing a specific program. The information storage part 20 is a function realized by a partial storage area of a storage device provided in the controller 8.

Various errors occur in the analysis device 6. The error detector 18 is configured to detect an error in the analysis device 6 and identify a type of an error that has occurred on the basis of an output from each sensor of the analysis device 6. For example, in a case where an output value of the pressure sensor that detects a system pressure exceeds a preset threshold, occurrence of clogging of the separation column is detected. Further, in a case where the output of the leak sensor exceeds a preset threshold, occurrence of liquid leakage of a mobile phase is detected.

The information storage part 20 stores a level set in advance for each error that may occur in the analysis device 6. The level of each error that may occur in the analysis device 6 may be a specified value, or a setting value of the level for each error may be optionally edited by the user. One criterion of the level set for an error is the seriousness of each error. For example, in a case where the monitoring system 1 is to be introduced into a manufacturing line of a drug substance, liquid leakage of a mobile phase (in particular, a flammable mobile phase such as acetonitrile) is an error having a higher risk of leading to a serious accident than other errors, and thus should be set to a highest level.

The error level identification part 22 is configured to identify a level set for an error that occurs in the analysis device 6 by using information stored in the information storage part 20 when the error detector 18 detects the occurrence of the error in the analysis device 6.

When occurrence of an error in the analysis device 6 is detected and a level of the error is identified, the controller 8 outputs an error signal corresponding to the level of the error that occurs to the management device 4. In this manner, the management device 4 can immediately detect what level of error occurs in the analysis device 6.

The management device 4 is configured to determine what kind of measure is to be performed by the analysis device 6 based on an error signal output from the controller 8. Specifically, the management device 4 reads a level of an error that occurs in the analysis device 6 from the error signal output from the controller 8, compares the level with a preset reference level to determine a measure to be executed in the analysis device 6, and outputs a control signal to the controller 8 so that the determined measure is executed. For example, in a case where a high-level error, by which there is a risk of inflammation if an energization state of each constituent of the analysis device 6 is kept, such as liquid leakage of a mobile phase occurs, the management device 4 outputs a control signal to the controller 8 to cut off power supply to all elements of the analysis device 6 and stop the energization state of the analysis device 6. Upon receiving the control signal from the management device 4, the controller 8 stops the energization state of the analysis device 6.

The management device 4 is provided with a reference setting part 24 which is a function of allowing the user to optionally set the "reference level". The reference setting part 24 is a function obtained by the CPU of the management device 4 executing a predetermined program. With this function, it is possible to freely set a reference for a level of an error for which energization in the analysis device 6 is stopped when such an error occurs.

Figure 2:
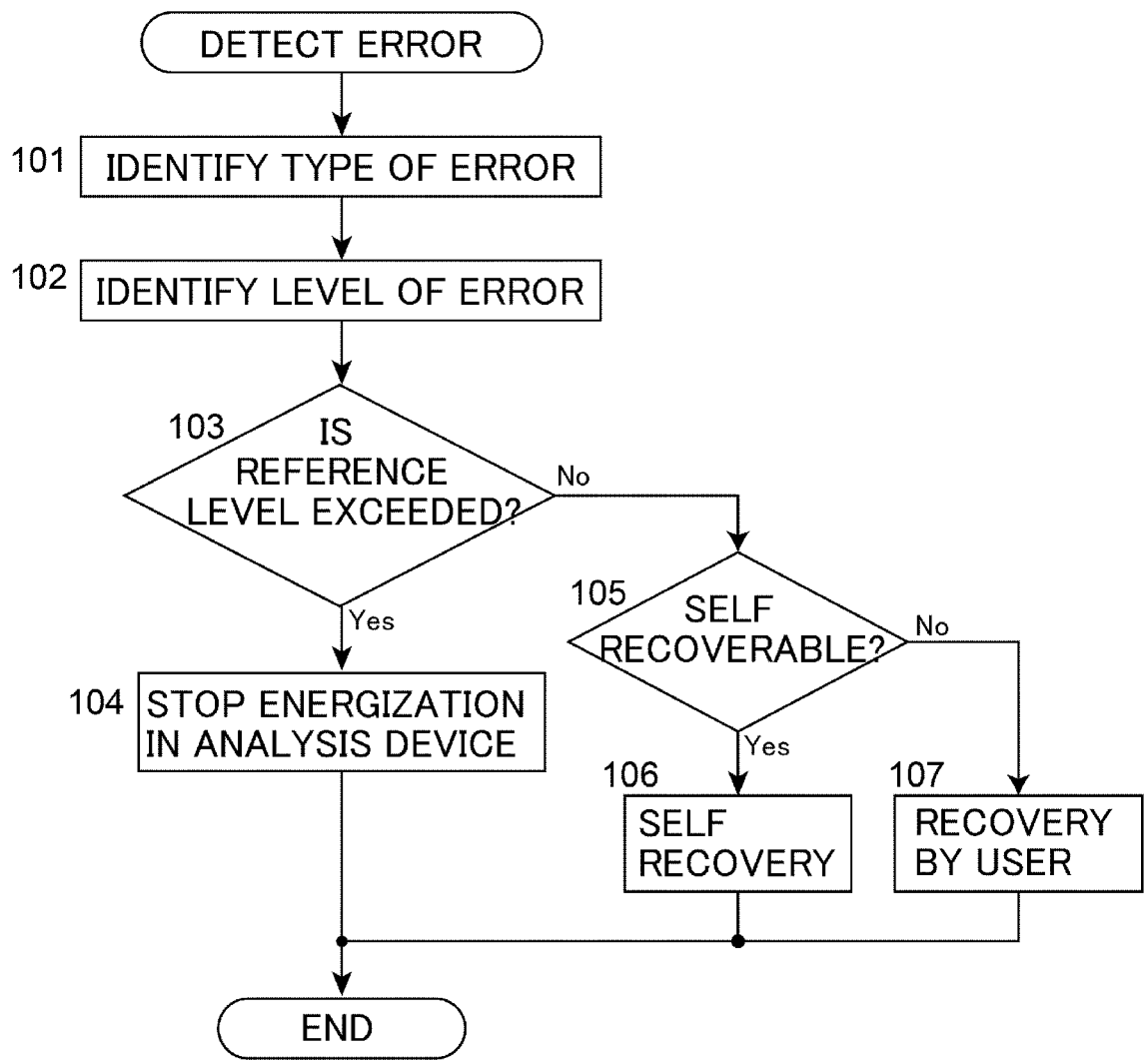
FIG. 2 is a flowchart illustrating an example of operation when an error is detected in the embodiment.

An example of operation when occurrence of an error is detected in the analysis device 6 will be described with reference to a flowchart of FIG. 2 together with FIG. 1.

When an error occurs in the analysis device 6, the controller 8 detects the error and identifies a type of the error that occurs (Step 101). Furthermore, the controller 8 specifies a level of the error that occurs (Step 102), and outputs an error signal corresponding to the level to the management device 4. The management device 4 determines whether or not the level of the error that occurs exceeds a preset reference level (Step 103).

In a case where a serious error whose level exceeds the reference level occurs (Step 103: Yes), a control signal to stop energization in the analysis device 6 is transmitted from the management device 4 to the controller 6, and the energization in the analysis device 6 is stopped (Step 104). Serious errors may include "liquid leakage of a mobile phase", "lowering of inert gas concentration in an internal pressure chamber storing the analysis device" error, and the like.

Note that, while all "liquid leakage of a mobile phase" errors may be defined as serious errors, it is also possible to define only liquid leakage of a specific type of mobile phase in "liquid leakage of a mobile phase" as a serious error. For example, while a mobile phase having a high risk of inflammation such as acetonitrile is defined as a serious error by setting a high error level, a mobile phase having a low risk of inflammation is defined as a non-serious error (minor error) by setting a low error level. In this case, the management device 4 refers to a method file (analysis condition) of analysis being performed when a liquid leakage error is detected, and identifies a type of a mobile phase being used to identify an error level. In this manner, it is possible to prevent all the energization in the analysis device 6 from being stopped even in a case where a mobile phase having a low risk of inflammation leaks.

In a case where a minor error whose level does not exceed the reference level occurs (Step 103: No), if the error is a self-recoverable error (the error can be resolved by the analysis device 6 itself), self-recovery processing is performed in the analysis device 6 (Step 105: Yes, Step 106), and if the error is not a self-recoverable error, operation of the analysis device 6 is stopped, and display or the like that prompts the user to perform work of resolving the error is performed (Step 105: No, Step 107). For example, in a case where a plurality of separation columns are provided in the column oven 14, and a separation column to be used can be changed only by switching a switching valve, when a "clogging in a separation column" error occurs, the error can be determined as a self-recoverable error. In this case, when the "clogging in a separation column" error occurs, the switching valve is switched to change the separation column to be used as the self-recovery processing. Minor errors can include "poor degassing of a mobile phase" in addition to "clogging in a separation column". Note that, since the user can optionally set the reference level for determining whether or not the error is a serious error, for example, the "clogging in a separation column" error can be defined as a serious error.

In the above embodiment, the management device 4 determines whether or not an error that occurs in the analysis device 6 is a serious error. However, the present invention is not limited to this configuration. The controller 8 itself that detects the occurrence of an error may be configured to determine whether or not a detected error is a serious error, and determine a subsequent measure on the basis of a result of the determination.

Further, in the above embodiment, only whether or not an error that occurs is a serious error is determined using one reference level. However, the present invention is not limited to this configuration, and errors that occur may be classified into multiple stages using a plurality of reference levels.

The embodiment described above is merely an example of an embodiment of the monitoring system according to the present invention. The embodiment of the monitoring system according to the present invention is as described below.

An embodiment of the monitoring system according to the present invention includes an analysis device provided with a plurality of sensors, an error detector configured to detect occurrence of an error in the analysis device based on an output signal of a plurality of the sensors, and to identify a type of the detected error, an information storage part storing levels which have been set in advance for each of a plurality of types of errors that may occur in the analysis device, and an error level identification part configured to identify a level of an error detected by the error detector based on information stored in the information storage part. Furthermore, the monitoring system is configured so that in a case where an error occurs in the analysis device, a measure according to the level of the error identified by the error level identification part is executed in the analysis device.

In a first aspect of the embodiment, the monitoring system is configured so that in a case where the level of the error identified by the error level identification part exceeds a reference level which has been set in advance, stopping of energization, which is the measure, in the analysis device is configured to be executed. In this manner, for example, in a case where a serious error such as liquid leakage of a flammable mobile phase occurs, energization in the analysis device can be stopped to prevent a fire.

The first aspect further includes a reference setting part configured to cause a user to set the reference level. In this manner, the user can optionally set a determination criterion as to whether or not an error that occurs is a serious error.

A second aspect of the embodiment further includes a controller including the error detector, the information storage part, and the error level identification part, and configured to control operation of the analysis device, and a management device configured to perform operation management of the analysis device via the controller. The controller is configured to output an error signal corresponding to the level of the error identified by the error level identification part to the management device at the time when the error is detected by the error detector, and the management device is configured to determine a measure to be executed in the analysis device based on the error signal output from the controller, and to output a control signal for causing the analysis device to execute the determined measure to the controller.

In a third aspect of the embodiment, the analysis device is a liquid chromatograph, and one of a plurality of the types of errors is liquid leakage, and, in the liquid leakage, liquid leakage of at least a specific type of a mobile phase is defined as an error at a highest level. According to such an aspect, when flammable liquid such as acetonitrile is used as a mobile phase and liquid leakage occurs, it is possible to prevent occurrence of afire or the like due to inflammation by stopping energization in the analysis device.

DESCRIPTION OF REFERENCE SIGNS 1 monitoring system
2 analysis system
4 management device
6 analysis device
8 controller
10 delivery device
12 autosampler
14 column oven
16 detector
18 error detector
20 information storage part
22 error level identification part
24 reference setting part

What is claimed is:

1. A monitoring system comprising:
an analysis device provided with a plurality of sensors;
an information storage part storing levels which have been set in advance for each of a plurality of types of errors that may occur in the analysis device;
an error detector configured to detect occurrence of each of the plurality of type of errors in the analysis device based on an output signal of the plurality of sensors; and
an error level identification part configured to identify a level of an error detected by the error detector based on information stored in the information storage part,
wherein the monitoring system is configured so that when an error occurs in the analysis device, a measure according to the level of the error identified by the error level identification part is executed in the analysis device,
the monitoring system is configured so that in a case where the level of the error identified by the error level identification part exceeds a reference level which has been set in advance, stopping of energization, which is the measure, in the analysis device is executed, and in the case where the level of the error identified by the error level identification part does not exceed the reference level which has been set in advance, a measure other than stopping of energization, in the analysis device is executed,
wherein an occurrence of at least one of the plurality of type of errors in the analysis device is detected based on the output signal of at least one of the plurality of sensors sensing a first parameter, and a level of the at least one of the plurality of type of errors is identified based on a second parameter different from the first parameter, and
wherein the analysis device is a liquid chromatograph, one of the plurality of types of errors is liquid leakage, and the monitoring system is configured to, when an error detected during an analysis of the liquid chromatograph is liquid leakage, identify a level of the detected error during the analysis based on information stored in the information storage part by:
obtaining, from a method file associated with the analysis, a type of mobile phase being used in the liquid chromatograph during the analysis;
determining, by reference to the information storage part, whether the obtained type of mobile phase corresponds to a specific type of mobile phase defined as a serious error; and
when the obtained type of mobile phase corresponds to the specific type defined as the serious error, stop all energization of the liquid chromatograph; and
when the obtained type of mobile phase does not correspond to the specific type defined as the serious error, executing a measure other than stopping all energization of the liquid chromatograph.

2. The monitoring system according to claim 1, further comprising a reference setting part configured to cause a user to set the reference level.

3. The monitoring system according to claim 1, further comprising:
- a controller including the error detector, the information storage part, and the error level identification part, and configured to control operation of the analysis device; and
- a management device configured to manage operation of the analysis device via the controller,
- wherein the controller is configured to output an error signal corresponding to the level of the error identified by the error level identification part to the management device at the time when the error is detected by the error detector, and
- the management device is configured to determine a measure to be executed in the analysis device based on the error signal output from the controller, and to output a control signal for causing the analysis device to execute the determined motion to the controller.

4. The monitoring system according to claim 1, wherein the specific type of mobile phase has a high risk of inflammation, and a mobile phase other than the specific type has a low risk of inflammation.

* * * * *